US012684349B2

(12) United States Patent
Fries et al.

(10) Patent No.: US 12,684,349 B2
(45) Date of Patent: Jul. 14, 2026

(54) METHOD OF ONBOARDING A USER DEVICE

(71) Applicant: Siemens Aktiengesellschaft, Munich (DE)

(72) Inventors: Steffen Fries, Baldham (DE); Rainer Falk, Erding (DE); Joachim Walewski, Unterhaching (DE); Michael Bahr, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 138 days.

(21) Appl. No.: 18/559,036

(22) PCT Filed: May 3, 2022

(86) PCT No.: PCT/EP2022/061827
§ 371 (c)(1),
(2) Date: Nov. 3, 2023

(87) PCT Pub. No.: WO2022/233857
PCT Pub. Date: Nov. 10, 2022

(65) Prior Publication Data
US 2024/0236671 A1      Jul. 11, 2024

(30) Foreign Application Priority Data
May 4, 2021      (EP) ..................................... 21172056

(51) Int. Cl.
*H04L 29/06*      (2006.01)
*H04W 12/06*      (2021.01)
(52) U.S. Cl.
CPC ..................................... *H04W 12/06* (2013.01)
(58) Field of Classification Search
None
See application file for complete search history.

(56) References Cited

U.S. PATENT DOCUMENTS 8,989,053 B1 * 3/2015 Skaaksrud .............. H04W 4/80
370/255
10,958,662 B1 * 3/2021 Sole .................... H04L 63/0853
(Continued)

FOREIGN PATENT DOCUMENTS

WO      2019156716 A1      8/2019
WO      2020153578 A1      7/2020
WO      2021061419 A1      4/2021

OTHER PUBLICATIONS

Salahuddin, Mohammad A. et al. Exploiting Context Severity to Achieve Opportunistic Service Differentiation in Vehicular Ad hoc Networks. IEEE Transactions on Vehicular Technology, vol. 63, Issue: 6. https://ieeexplore.ieee.org/stamp/stamp.jsp?tp=&arnumber=6687262 (Year: 2014).*

(Continued)

*Primary Examiner* — Jeremiah L Avery
(74) *Attorney, Agent, or Firm* — Lempia Summerfield Katz LLC

(57)      ABSTRACT

A method of onboarding a user device onto an industrial network includes receiving a registration request from the user device. The user device is connected to a gateway device associated with a first wireless network. The registration request includes one or more network access parameters associated with the user device. At least one network access parameter from the network access parameters is indicative of the gateway device and/or the first wireless network. The method includes authenticating the user device based on the received registration request. Authenticating includes verifying validity of network access parameters of the registration request. The method allows for utilization of network access data to evaluate if the user device is indeed (Continued)

an actual user device or an unauthorized device. Accordingly, an overall security associated with the onboarding process is improved.

19 Claims, 2 Drawing Sheets

(56)                    References Cited

U.S. PATENT DOCUMENTS

| 11,050,763 | B1 * | 6/2021 | Lyle | H04L 9/3239 |
|---|---|---|---|---|
| 11,159,931 | B1 * | 10/2021 | Mittal | G06F 3/0488 |
| 11,184,224 | B2 * | 11/2021 | Johnson | H04L 63/105 |
| 11,284,258 | B1 * | 3/2022 | Wei | H04L 63/10 |
| 2013/0243189 | A1 * | 9/2013 | Ekberg | H04L 63/123 |
| | | | | 380/44 |
| 2015/0222517 | A1 * | 8/2015 | McLaughlin | G06F 21/445 |
| | | | | 713/171 |
| 2016/0330601 | A1 * | 11/2016 | Srivastava | G06Q 50/265 |
| 2016/0345176 | A1 * | 11/2016 | DeWitt | H04W 4/021 |
| 2018/0068567 | A1 * | 3/2018 | Gong | H04W 4/022 |
| 2020/0119913 | A1 * | 4/2020 | Neumann | H04W 4/33 |
| 2020/0120458 | A1 * | 4/2020 | Aldana | H04W 28/22 |
| 2020/0280842 | A1 * | 9/2020 | Liu | H04W 4/44 |
| 2021/0099339 | A1 * | 4/2021 | Behm | H04L 41/085 |
| 2021/0126912 | A1 * | 4/2021 | Maclean | H04W 12/065 |
| 2021/0314748 | A1 * | 10/2021 | Cominetti | H04W 12/069 |
| 2021/0336797 | A1 * | 10/2021 | Van Duren | H04L 9/3247 |
| 2021/0360401 | A1 * | 11/2021 | Marinho | H04L 45/02 |
| 2021/0367839 | A1 * | 11/2021 | Vanderveen | H04L 41/0894 |
| 2021/0400048 | A1 * | 12/2021 | Liem | G07C 9/29 |
| 2022/0021665 | A1 * | 1/2022 | Barton | H04L 63/08 |
| 2022/0104008 | A1 * | 3/2022 | Luo | G01S 1/0428 |

OTHER PUBLICATIONS

Bouaziz, Maha et al. Zero On-Site Testing Strategies for Wireless TCMS. IEEE Communications Magazine, vol. 57, Issue: 9. https://ieeexplore.ieee.org/stamp/stamp.jsp?tp=&arnumber=8847228 (Year: 2019).*

Khabbaz, Maurice, Artail, Hassan. Deadline-Aware UE Service Scheduling in Mobile-Relay-Augmented Cellular Networks. 2019 IEEE Wireless Communications and Networking Conference (WCNC). https://ieeexplore.ieee.org/stamp/stamp.jsp?tp=&arnumber=8886039 (Year: 2019).*

"3rd Generation Partnership Project; Technical Specification Group Services and System Aspects; Study on enhanced support of Non-Public Networks (NPN) (Release 17)"; 3GPP Standard; Technical Report; 23.700-07, 3rd Generation Partnership Project (3GPP), Mobile Competence Centre, France; vol. SA WG2, No. V17.0.0, Mar. 31, 2021, pp. 1-248.

PCT International Search Report and Written Opinion of International Searching Authority mailed Aug. 4, 2022 corresponding to PCT International Application No. PCT/EP2022/061827.

* cited by examiner

FIG 2 <u>200</u>
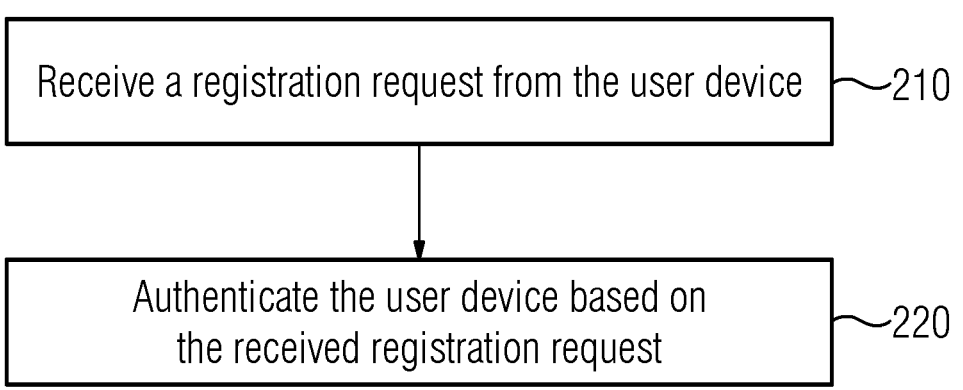
FIG 3
<u>300</u>
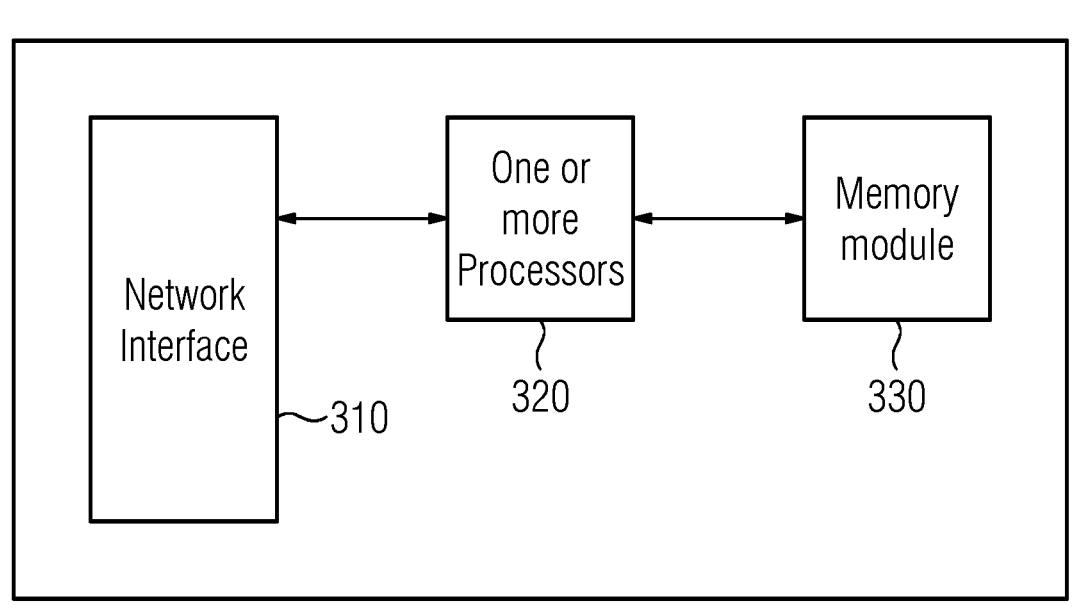

METHOD OF ONBOARDING A USER DEVICE

This application is the National Stage of International Application No. PCT/EP2022/061827, filed May 3, 2022, which claims the benefit of European Patent Application No. EP 21172056.0, filed May 4, 2021. The entire contents of these documents are hereby incorporated herein by reference.

BACKGROUND

The current disclosure relates to onboarding of industrial devices and, more particularly, relates to secure onboarding of wireless industrial devices onto industrial networks. With the adoption of 5G and other wireless technologies in industrial automation, many industrial devices utilize wireless technologies for communication, and accordingly, upon installation of these devices in the industrial facility, the devices are to be onboarded to enable communication and proper functioning of these devices.

SUMMARY AND DESCRIPTION

The scope of the present invention is defined solely by the appended claims and is not affected to any degree by the statements within this summary.

With the adoption of 5G transmission technologies, industrial wireless communication is able to provide special features such as high data transfer rates, low latency, interference robustness, etc. This allows for greater application in industrial environments (e.g., factory networks). Accordingly, a multitude of wireless industrial devices are expected to be utilized in the industrial environments. Accordingly, during installation and commissioning of these wireless devices, network access authentication is provided to provide that only authorized subscribers have access. The same applies when subscribers need to access a cloud service (e.g., edge cloud, back-end cloud) or a web service. Authentication is to be provided to prevent an unauthorized device from being registered and provided access to the industrial network. Conventionally, authentication during onboarding is performed using special checks such as PINs or registration passwords, etc. However, the security of such simple authentication procedures to protect onboarding is limited. There is therefore a need to better protect onboarding.

Accordingly, the current disclosure describes a method of onboarding a user device onto an industrial network. The method includes receiving a registration request from the user device. The user device is connected to a gateway device associated with a first wireless network. The registration request includes one or more network access parameters associated with the user device. At least one network access parameter from the one or more network access parameters is indicative of the gateway device and/or the first wireless network. The method further includes authenticating the user device based on the received registration request. Authenticating the user device includes verifying validity of one or more network access parameters of the registration request.

Accordingly, the current disclosure allows for utilization of network access data associated with the user device to evaluate if the user device is authorized to be registered on the industrial network or not. By utilizing network information, the overall security associated with the onboarding process is improved, thereby reducing the likelihood of misuse. Further, access decisions are enabled on more detailed and diverse network related parameters (e.g., access to a specific access point with specific frequency band from a specific location). Since network information is difficult to replicate, as it is intrinsic to the transmission of the registration request, the security of the onboarding process may be increased.

In an example, the one or more network access parameters include an identifier associated with gateway device, an identifier associated with a transmission channel on which the registration request is transmitted, and one or more identifiers associated with one or more network devices within a predetermined proximity.

In an example, the method further includes obtaining network information associated with the first wireless network from a network management device of the first wireless network. The network information is for verifying the validity of the one or more network access parameters of the registration request. Accordingly, the current disclosure allows for fetching network information from the network management devices associated with the plurality of wireless networks in the industrial facility to verify the network access parameters. Accordingly, any change in the network configuration is also known to the onboarding device.

In an example, the method further includes generating provisioning data for the user device based on the received registration request. Accordingly, based on the received registration request, the onboarding device is configured to generate provisioning data that is used by the user device or in relation to the user device. In an example, the provisioning data includes at least one configuration parameter. Validity of the at least one configuration parameter is determined based on the one or more network access parameters. Accordingly, this allows for varying privileges for user devices based on the network access parameters. This allows for customizing the security associated with the user device based on the network access parameters.

In an example, the provisioning data includes an identity certificate (e.g., public key certificate) used by the user device for communicating with at least one network device of the industrial network. The identity certificate includes the one or more network access parameters of the registration request. Accordingly, this allows for storing of the network access parameters within the provisioning data. Accordingly, even after registration and onboarding, the network access parameters at the time of registration may be used to verify the user device.

In an example, the provisioning data further includes an onboarding profile associated with the user device. The onboarding profile includes information associated with one or more services and applications associated with the user device, and an identifier associated with at least one enrollment server. The user device is configured to communicate with the at least one enrollment server based on the identifier associated with the at least one enrollment server. Accordingly, this allows for faster and simpler configuration of the user device subsequent to the onboarding of the user device onto the industrial network. The user device is configured to utilize the onboarding profile to establish communication with the related services and applications. In an example, the onboarding profile is generated based on a device identifier of the registration request.

In another aspect, the current disclosure describes an onboarding device for onboarding a user device onto an industrial network. The onboarding device includes one or more processors connected to a memory module including a plurality of instructions. The one or more processors are configured to receive a registration request from the user device and authenticate the user device based on the received registration request. The user device is connected to a gateway device associated with a first wireless network. The registration request includes one or more network access parameters associated with the user device. At least one network access parameter from the one or more network access parameters is indicative of the gateway device and/or the first wireless network. Authenticating the user device includes verifying validity of one or more network access parameters of the registration request. Advantages of the method apply to the device as well. These aspects are further described in relation to FIGS. 1-3.

BRIEF DESCRIPTION OF THE DRAWINGS

The following detailed description references the drawings, wherein:

FIG. 2 illustrates an example method for onboarding a user device onto an industrial network; and FIG. 3 illustrates an example onboarding device for onboarding a user device onto an industrial network.

DETAILED DESCRIPTION

Figure 1:
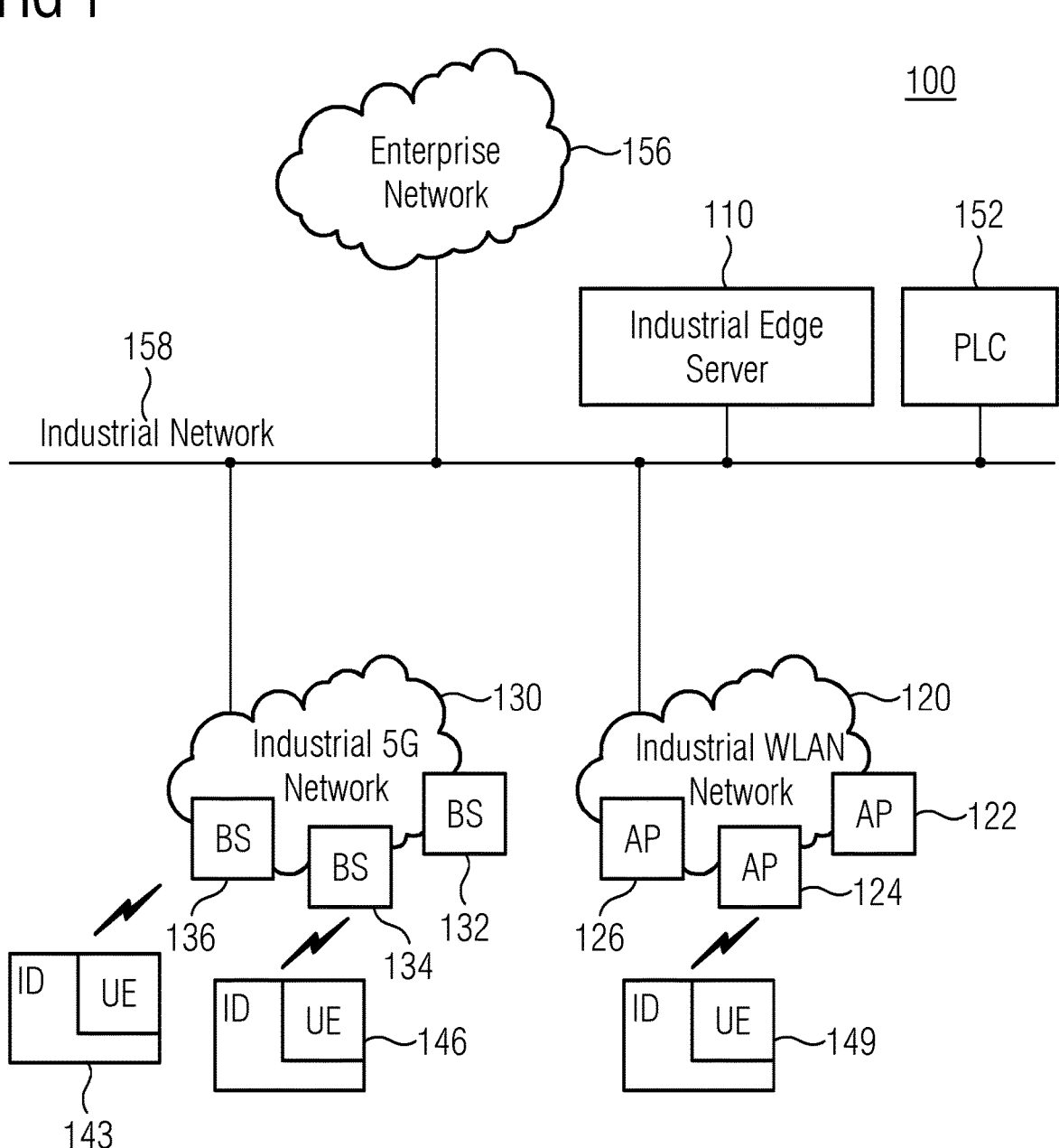
FIG. 1 illustrates an example section of an industrial facility including an industrial network onto which user devices may be onboarded.

FIG. 1 illustrates a section 100 of an industrial facility. Industrial facility herein refers to any environment where one or more industrial processes such as manufacturing, refining, smelting, or assembly of equipment may take place and includes process plants, oil refineries, automobile factories, substations, etc. The industrial facility includes a plurality of control devices (shown in FIG. 1 as programmable logic controller 152), such as process controllers, programmable logic controllers (PLCs), supervisory controllers, automated guidance vehicles, robots, operator devices, etc. One or more control devices are connected to a plurality of field devices (not shown in FIG. 1), such as actuators and sensor devices for monitoring and controlling industrial processes in the industrial facility. These field devices may include flowmeters, value actuators, temperature sensors, pressure sensors, etc. The control devices may be connected to each other via a control network (e.g., realized via wired and wireless networks). Additionally, the industrial facility includes: a plurality of mobile units including one or more robots for performing a plurality of operations such as welding and assembly of parts; one or more autonomous guidance vehicles for transportation and handling of material; and one or more assets with RFID tags on conveyor belts, etc., in the industrial facility.

Communication in the industrial facility happens through an industrial network 158. The industrial network 158 includes a plurality of wired and wireless networks. For example, as shown in the FIG. 1, the industrial network 158 includes a first wireless network 130 and a second wireless network 120. Additionally, the industrial network 158 is connected to an enterprise network 156. The enterprise network 156 includes asset management systems, manufacturing execution systems, etc.

Each wireless network includes a plurality of network devices. The plurality of network devices includes one or more gateway devices and one or more user devices. Gateway device herein refers to network devices, which are used for connecting other network devices to the network and includes base stations, access points, routers, switches, etc. The gateway devices are affixed to a plurality of locations in the industrial facility. The user devices in the industrial facility are connected to the gateway devices for connecting to the corresponding wireless network and for communicating information with the other devices and systems in the industrial facility. For example, the first wireless network 130 is a 5G wireless network 130 including gateway devices or base stations (132, 134, and 136) and user devices (143 and 146). Similarly, in an example, the second wireless network 120 is a wireless local area network 120 that includes gateway devices or access points (122, 124 and 126) and a user device 149. Additionally, each wireless network includes a network management device or function that is responsible for managing the corresponding wireless network (not shown). Additionally, the industrial network 158 includes an industrial edge server 110, which is responsible for onboarding of new devices onto the industrial network 158. The industrial edge server 110 is configured to check the validity of a new user device of either the first wireless network or the second wireless network, and onboard the new user device onto the industrial network 158. This is further explained in the description of FIG. 2.

FIG. 2 illustrates a method 200 for onboarding a user device 143 onto the industrial network 158. In an example, the method 200 is implemented by the industrial edge server 110. At act 210, the industrial edge server 110 receives a registration request from the user device 143. The user device 143 is a new device in the industrial facility and has not yet been onboarded onto the industrial network 158. Accordingly, the user device 143 does not have access to the devices, applications, and services on the industrial network 158. Additionally, the user device 143 is configured to connect to a base station 136 of the first wireless network 130 and, accordingly, prior to the transmission of the registration request, connects to the base station 136 of the first wireless network 130. Subsequent to connecting to the base station 136, the user device 143 transmits the registration request to the industrial edge server via the base station 136 of the first wireless network 130. The registration request is transmitted from the user device 143 for requesting the industrial edge server 110 to onboard the user device 143 onto the industrial network 158.

The registration request from the user device 143 includes one or more network access parameters associated with user device 143. The at least one network access parameter is indicative of the gateway device 136 and/or the first wireless network 130. Network access parameter herein refers to network parameters associated with the user device 143 and the first wireless network 130, which is indicative of network access associated with the user device 143. Examples of network access parameters include an identifier associated with the first base station 136, the logical transmission channel utilized to transmit the registration request, a frequency band utilized for transmission of the registration request, a radio channel on which the registration request is transmitted, a modulation method used in relation to the registration request, a signal strength associated with the signal related to the registration request, the direction of departure associated with the transmission of the registration request, identifiers of the neighboring devices within a predefined proximity of the user device 143, the network slice used, etc.

Then, at act 220, the industrial edge server 110 authenticates the user device 143 based on the received registration request. For authenticating the user device 143, the industrial edge server 110 verifies the validity of one or more network access parameters of the registration request. In an example, the industrial edge server 110 checks the information associated with the network access parameter against network configuration and network data associated with the first wireless network 130 to check if the information associated with the network access parameters is inline or matches with the network configuration and network data associated with the first wireless network 130. In an example, the registration request includes an identifier associated with the first base station 136, the frequency band utilized for transmission of the registration request, and an identifier of the neighboring user device 146. Based on the network information associated with the first wireless network 130, the industrial edge server 110 checks if the identifier associated with the first base station 136 is present in a list of identifiers associated with the base stations (132, 134 and 136) of the first wireless network 130. Similarly, based on the network information of the first wireless network 130, the industrial edge server 110 checks if the identifier associated with the neighboring user device 146 is present in a list of identifiers associated with the network devices (132, 134, 136 and 146) of the first wireless network 130. Accordingly, if both the identifiers from the registration request match the identifiers from the network information with the first wireless network 130, the industrial edge server 110 determines that the user device 143 is an authentic network device. If either of the identifiers from the registration request does not match the identifiers from the network information with the first wireless network 130, the industrial edge server 110 determines that the user device 143 is not an authentic network device. In an example, the industrial edge server 110 includes a predefined admissibility policy (also referred to as acceptance criteria), which is used to determine to authenticate the user device 143 based on the one or more network access parameters in the registration request. The admissibility policy may include a set of rules defined by a user or by a security module.

Accordingly, the industrial edge server 110 is able to authenticate the user device 143 based on network access information as provided in the registration request and the network information associated with the wireless networks in the industrial facility. Since the network access information is more difficult to manipulate, the overall security of the onboarding process is improved.

In an example, the registration request further includes a device certificate or a device passcode that is further used by the industrial edger server 110 to authenticate the user device 143. In an example, the device certificate is provided to the user device 143 during the manufacture of the user device 143. In another example, the user device 143 is provided with the device certificate or the passcode by a configuration tool during the commissioning of the user device 143. In the example, in addition to the other network access parameters, the registration request from the user device 143 includes an identifier associated with the configuration tool. Accordingly, upon receiving the registration request, the industrial edge server 110 is able to authenticate the user device 143 based on the device certificate and the identifier associated with the configuration tool in addition to the other network access parameters included in the registration request. In an example, the method 200 further includes obtaining network information associated with the first wireless network from a network management device of the first wireless network. The industrial edge server is configured to fetch or obtain network information of the first wireless network 130 from the network management device (not shown in figure) of the first wireless network 130. For example, for a 5G based wireless network, the industrial edge server is configured to fetch network information from the network exposure function (NEF) of the 5G core.

In an example, the method 200 further includes generating provisioning data for the user device based on the received registration request. Subsequent to the authentication of the user device 143, the industrial edge server 110 is configured to generate provisioning data for the user device 143 based on the received registration request. The provisioning data is utilized for providing the user device 143 with access to the devices, applications, and services available on the industrial network 158. For example, the provisioning data includes network certificates, addresses of application servers, device certificates needed for communicating with the application servers, etc.

During the generation of the provisioning data, the industrial edge server 110 utilizes the network access parameters to determine one or more aspects of the provisioning data. In an example, the industrial edge server determined various aspects of the provisioning data such as validity period of a digital certificate, attributes contained in a certificate or provided as associated attribute certificate, granted permissions, allowed communication protocols, allowed QoS parameters, and allowed network slices for the user device 143 based on the one or more network access parameters of the registration request.

In an example, where the provisioning data includes at least one configuration parameter such as certificates, granted permissions, allowed network slices, etc., the validity of the at least one configuration parameter is determined based on the one or more network access parameters. For example, based on the confidence and values associated with the network access parameters, the industrial edge server 110 determines a time period for which the at least one configuration parameter is valid. For example, the validity period of a device certificate (e.g., configuration parameter) required to connect and communicate with an application server containing sensitive information may be determined based on the identifier of the base station provided in the registration request. For example, for identifiers of base stations present around the periphery of the industrial facility, the validity period of the device certificate may be of a first predetermined value (e.g., 24 hours), and for identifiers of base stations not present in the periphery of the industrial facility, the validity period of the device certificate may be of a second predetermined value (e.g., 48 hours) where the first predetermined value is less than the second predetermined value.

In another example, the provisioning data includes an identity certificate used by the user device for communicating with at least one network device of the industrial network. The industrial edge server 110 generates the identity certificate based on the one or more network access parameters of the registration request. The identity certificate includes the one or more network access parameters. Accordingly, this allows for subsequent network devices (e.g., other base stations, application servers, PLCs, etc.) to determine the network access parameters evaluated by the industrial edge server 110 during the onboarding of the user device 143. Accordingly, subsequent network devices may utilize the identity certificate to authenticate the user device 143 and to evaluate if the user device 143 is to be trusted or not, based on the contained parameter.

In another example, the provisioning data further includes an onboarding profile associated with the user device. The onboarding profile comprises information associated with one or more services and applications associated with the user device and an identifier associated with at least one enrollment server. The user device 143 is configured to communicate with the at least one enrollment server based on the identifier associated with the at least one enrollment server to subscribe to the services associated with the user device 143. Accordingly, this allows for faster onboarding as well.

In industrial operational networks, different credentials are typically required to log on to networks and/or applications. Conventionally, this is performed in a sequence, and therefore, the user device 143 needs to spend considerable time in establishing communication with multiple applications or services. However, by using the onboarding profile, information for the credentials (e.g., for application required later on) for the user device may be provided during onboarding of the user device onto the industrial network. If the credentials are distributed at the same time, since the functionality of the device is known in the backend, a faster commissioning of the user device is provided.

In an example, the onboarding profile is generated based on a device identifier of the registration request. In an example, the device identifier associated is provided in a manufacturer's certificate associated with the user device 143 and is provided in the registration request by the user device 143. In an example, in addition to the above information, the onboarding profile may further include specific parameters required when applying for credentials (e.g., for a certificate according to the certificate profile of the respective service/application). These may be certain identifiers or alternative names, or usage extensions (e.g., for role-based access control) to be included in the requested certificate. Additionally, the onboarding profile may also include an order or a sequence of onboarding for the various services especially when there are some dependencies between the services.

Accordingly, through the usage of the onboarding profile, the commissioning of services and applications in relation to the user device starts immediately after the network access and allows the user device to apply for the required credentials to the planned services without an elaborate discovery on the client side. This saves time during commissioning. In addition, the onboarding profile may also be simulated and verified by the provisioning server in advance, so that errors in the configuration may be identified even before the actual commissioning.

It is to be noted that while the above method 200 is explained in relation to industrial edge server 110, the above method 200 may be realized in another device or a plurality of devices. For example, the method 200 may be implemented in a central network management device or a provisioning server. Accordingly, the present disclosure may take a form of a computer program product including program modules accessible from computer-usable or computer-readable medium storing program code for use by or in connection with one or more computers, processing units, or instruction execution system.

Accordingly, the current disclosure describes an onboarding device 300 as shown in FIG. 3. The onboarding device 300 is similar to the industrial edge sever 110 and is for onboarding a user device 143 onto an industrial network 158. The onboarding device includes a network interface 310 for communicating with the user device 143, and one or more processors 320 connected to a memory module 330 (also referred to as non-transitory memory module). The one or more processors 320 are configured to receive a registration request from the user device 143. The user device 143 is connected to a gateway device 136 associated with a first wireless network 130. The registration request includes one or more network access parameters associated with user device 143. The at least one network access parameter is indicative of the gateway device 136 and/or the first wireless network 130. The one or more processors 320 are also configured to authenticate the user device 143 based on the received registration request. Authenticating the user device includes verifying validity of one or more network access parameters of the registration request.

In another aspect, the current disclosure describes a non-transitory storage module 330 for onboarding a user device 143 onto an industrial network 158. The non-transitory storage module 330 includes a plurality of instructions that, when executed on one or more processors 320, cause the one or more processors 320 to receive a registration request from the user device 143. The user device 143 is connected to a gateway device 136 associated with a first wireless network 130. The registration request includes one or more network access parameters associated with user device 143. The at least one network access parameter is indicative of the gateway device 136 and/or the first wireless network 130. The plurality of instructions, when executed on the one or more processors 320, also cause the one or more processors 320 to authenticate the user device 143 based on the received registration request. Authenticating the user device includes verifying validity of one or more network access parameters of the registration request.

For the purpose of this description, a computer-usable or computer-readable non-transitory storage medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device), or propagation mediums in and of themselves as signal carriers are not included in the definition of physical computer-readable medium. Physical computer-readable medium includes a semiconductor or solid state memory, magnetic tape, a removable computer diskette, random access memory (RAM), a read only memory (ROM), a rigid magnetic disk, and optical disk such as compact disk read-only memory (CD-ROM), compact disk read/write, and DVD. Both processing units and program code for implementing each aspect of the technology may be centralized or distributed (or a combination thereof) as known to those skilled in the art.

In view of the present disclosure, many modifications and variations would present themselves to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All embodiments claimed in method claims may also be applied to device/non transitory storage medium claims.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of onboarding a user device onto an industrial network, the method comprising:

receiving a registration request from the user device, wherein the user device is connected to a gateway device associated with a first wireless network, wherein the registration request includes one or more network access parameters associated with the user device, and wherein at least one network access parameter of the one or more network access parameters is indicative of the gateway device, the first wireless network, or the gateway device and the first wireless network;

obtaining network information associated with the first wireless network from a network management device of the first wireless network; and authenticating the user device based on the received registration request, wherein authenticating the user device comprises verifying validity of one or more network access parameters of the registration request, wherein the network information is for verifying the validity of the one or more network access parameters of the registration request, wherein the one or more network access parameters include an identifier associated with the gateway device, an identifier associated with a transmission channel on which the registration request is transmitted, or one or more identifiers associated with one or more network devices within a predetermined proximity, and wherein verifying validity of the one or more network access parameters of the registration request comprises verifying validity of a logical transmission channel utilized to transmit the registration request, a frequency band utilized for transmission of the registration request, a radio channel on which the registration request is transmitted, a modulation method used in relation to the registration request, a signal strength associated with a signal related to the registration request, a direction of departure associated with the transmission of the registration request, or any combination thereof.

2. The method of claim 1, further comprising generating provisioning data for the user device based on the received registration request.

3. The method of claim 2, wherein the provisioning data includes at least one configuration parameter, and wherein validity of the at least one configuration parameter is determined based on the one or more network access parameters.

4. The method of claim 2, wherein the provisioning data includes an identity certificate used by the user device for communicating with at least one network device of the industrial network, and wherein the identify certificate includes the one or more network access parameters of the registration request.

5. The method of claim 2, wherein the provisioning data further comprises an onboarding profile associated with the user device, wherein the onboarding profile comprises information associated with one or more services and applications associated with the user device and an identifier associated with at least one enrollment server, and wherein the user device is configured to communicate with the at least one enrollment server based on the identifier associated with the at least one enrollment server.

6. The method of claim 5, wherein the onboarding profile is generated based on a device identifier of the registration request.

7. The method of claim 5, wherein the onboarding profile comprises a sequence of onboarding associated with the one or more services and applications.

8. The method of claim 7, wherein the onboarding profile further comprises one or more credentials associated with the one or more services and applications, and wherein the user device is configured to transmit the one or more credentials to the at least one enrollment server for authentication of the user device.

9. The method of claim 8, wherein the onboarding profile further comprises certificate attributes and signing information, wherein the certificate attributes and the signing information are used by the user device to generate a certificate to communicate with the at least one enrollment server.

10. The method of claim 1, wherein verifying validity of the one or more network access parameters of the registration request comprises verifying validity of the logical transmission channel, the frequency band, the radio channel, the modulation method, the direction of departure, or any combination thereof.

11. The method of claim 10, wherein verifying validity of the one or more network access parameters of the registration request comprises verifying validity of the frequency band, the modulation method, the direction of departure, or any combination thereof.

12. The method of claim 10, wherein verifying validity of the one or more network access parameters of the registration request comprises verifying validity of the modulation method, the direction of departure, or a combination thereof.

13. An onboarding device for onboarding a user device onto an industrial network, the onboarding device comprising:

a network interface for communicating with the user device;

one or more processors connected to a memory module, the one or more processors configured to:

receive a registration request from the user device, wherein the user device is connected to a gateway device associated with a first wireless network, wherein the registration request includes one or more network access parameters associated with the user device, and wherein at least one network access parameter of the one or more network access parameters is indicative of the gateway device, the first wireless network, or the gateway device and the first wireless network;

obtain network information associated with the first wireless network from a network management device of the first wireless network; and authenticate the user device based on the received registration request, wherein the authentication of the user device comprises verification of validity of one or more network access parameters of the registration request, wherein the network information is for the verification of the validity of the one or more network access parameters of the registration request, wherein the one or more network access parameters include an identifier associated with the gateway device, an identifier associated with a transmission channel on which the registration request is transmitted, or one or more identifiers associated with one or more network devices within a predetermined proximity, and wherein the verification of the validity of the one or more network access parameters of the registration request comprises verification of validity of a logical transmission channel utilized to transmit the registration request, a frequency band utilized for transmission of the registration request, a radio channel on which the registration request is transmitted, a modulation method used in relation to the registration request, a signal strength associated with a signal related to the registration request, a direction of departure associated with the transmission of the registration request, or any combination thereof.

14. A non-transitory computer-readable storage medium that stores instructions executable by one or more processors to onboard a user device onto an industrial network, the instructions comprising:

receiving a registration request from the user device, wherein the user device is connected to a gateway device associated with a first wireless network, and wherein the registration request includes one or more network access parameters associated with the user device, wherein at least one network access parameter of the one or more network access parameters is indicative of the gateway device, the first wireless network, or the gateway device and the first wireless network;

obtaining network information associated with the first wireless network from a network management device of the first wireless network; and authenticating the user device based on the received registration request, wherein authenticating the user device comprises verifying validity of the one or more network access parameters of the registration request, wherein the network information is for verifying the validity of the one or more network access parameters of the registration request, wherein the one or more network access parameters include an identifier associated with the gateway device, an identifier associated with a transmission channel on which the registration request is transmitted, or one or more identifiers associated with one or more network devices within a predetermined proximity, and wherein verifying validity of the one or more network access parameters of the registration request comprises verifying validity of a logical transmission channel utilized to transmit the registration request, a frequency band utilized for transmission of the registration request, a radio channel on which the registration request is transmitted, a modulation method used in relation to the registration request, a signal strength associated with a signal related to the registration request, a direction of departure associated with the transmission of the registration request, or any combination thereof.

15. The non-transitory computer-readable storage medium of claim 14, wherein the instructions further comprise generating provisioning data for the user device based on the received registration request.

16. The non-transitory computer-readable storage medium claim 15, wherein the provisioning data includes at least one configuration parameter, and wherein validity of the at least one configuration parameter is determined based on the one or more network access parameters.

17. The non-transitory computer-readable storage medium of claim 15, wherein the provisioning data includes an identity certificate used by the user device for communicating with at least one network device of the industrial network, and wherein the identify certificate includes the one or more network access parameters of the registration request.

18. The non-transitory computer-readable storage medium of claim 15, wherein the provisioning data further comprises an onboarding profile associated with the user device, wherein the onboarding profile comprises information associated with one or more services and applications associated with the user device and an identifier associated with at least one enrollment server, and wherein the user device is configured to communicate with the at least one enrollment server based on the identifier associated with the at least one enrollment server.

19. The non-transitory computer-readable storage medium of claim 18, wherein the onboarding profile is generated based on a device identifier of the registration request.

* * * * *